F. ROSSKOPF.
MEASURING AND PLOTTING INSTRUMENT.
APPLICATION FILED AUG. 7, 1920.
1,398,243.
Patented Nov. 29, 1921.
2 SHEETS—SHEET 1.
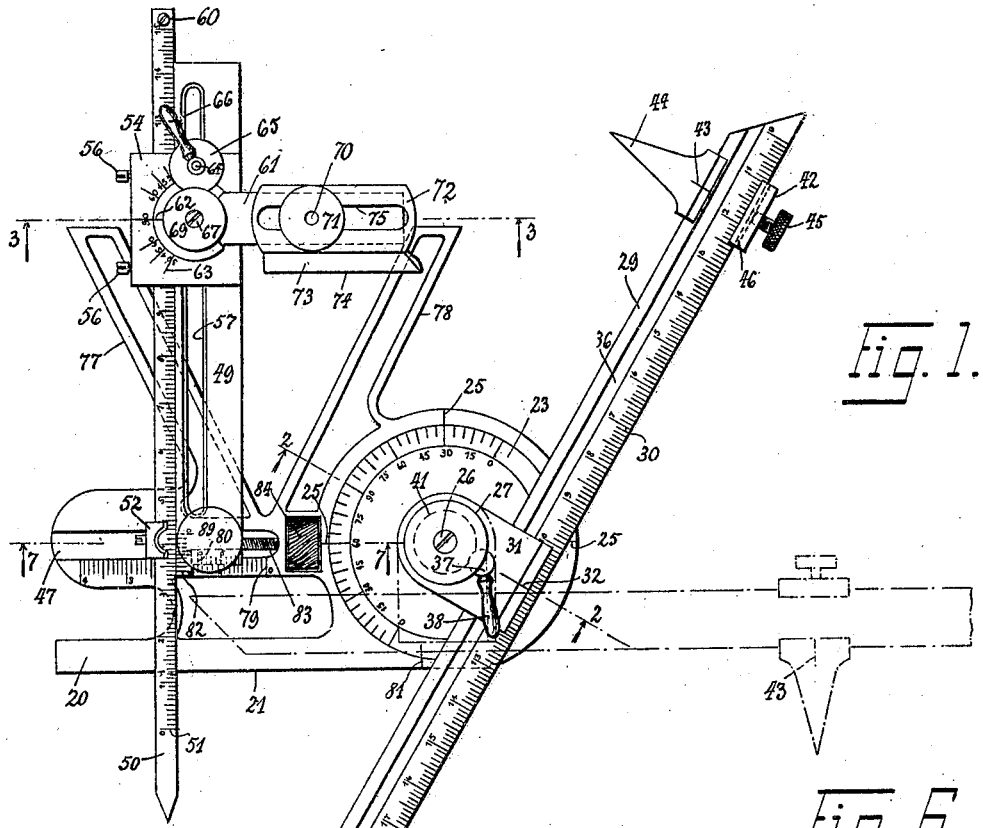
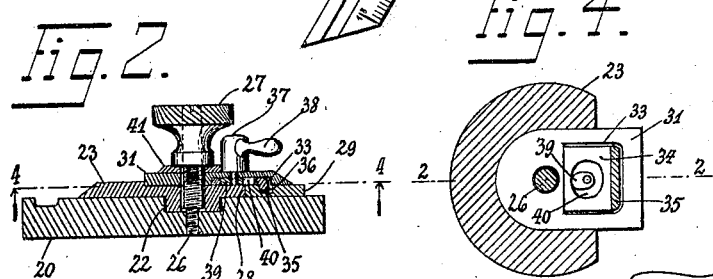
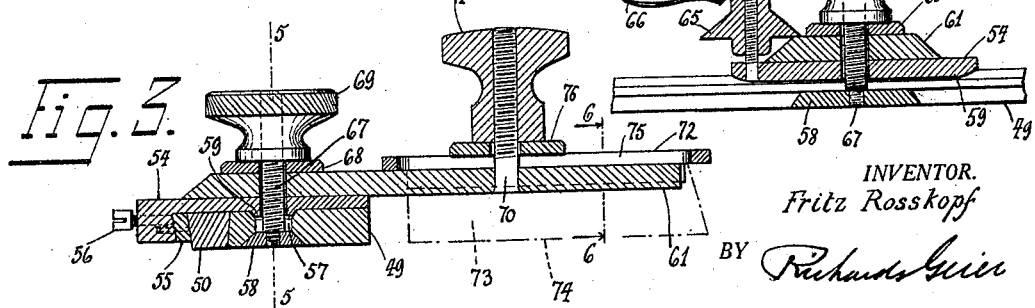
INVENTOR.
Fritz Rosskopf
BY
ATTORNEYS F. ROSSKOPF.
MEASURING AND PLOTTING INSTRUMENT.
APPLICATION FILED AUG. 7, 1920.
1,398,243.
Patented Nov. 29, 1921.
2 SHEETS—SHEET 2.
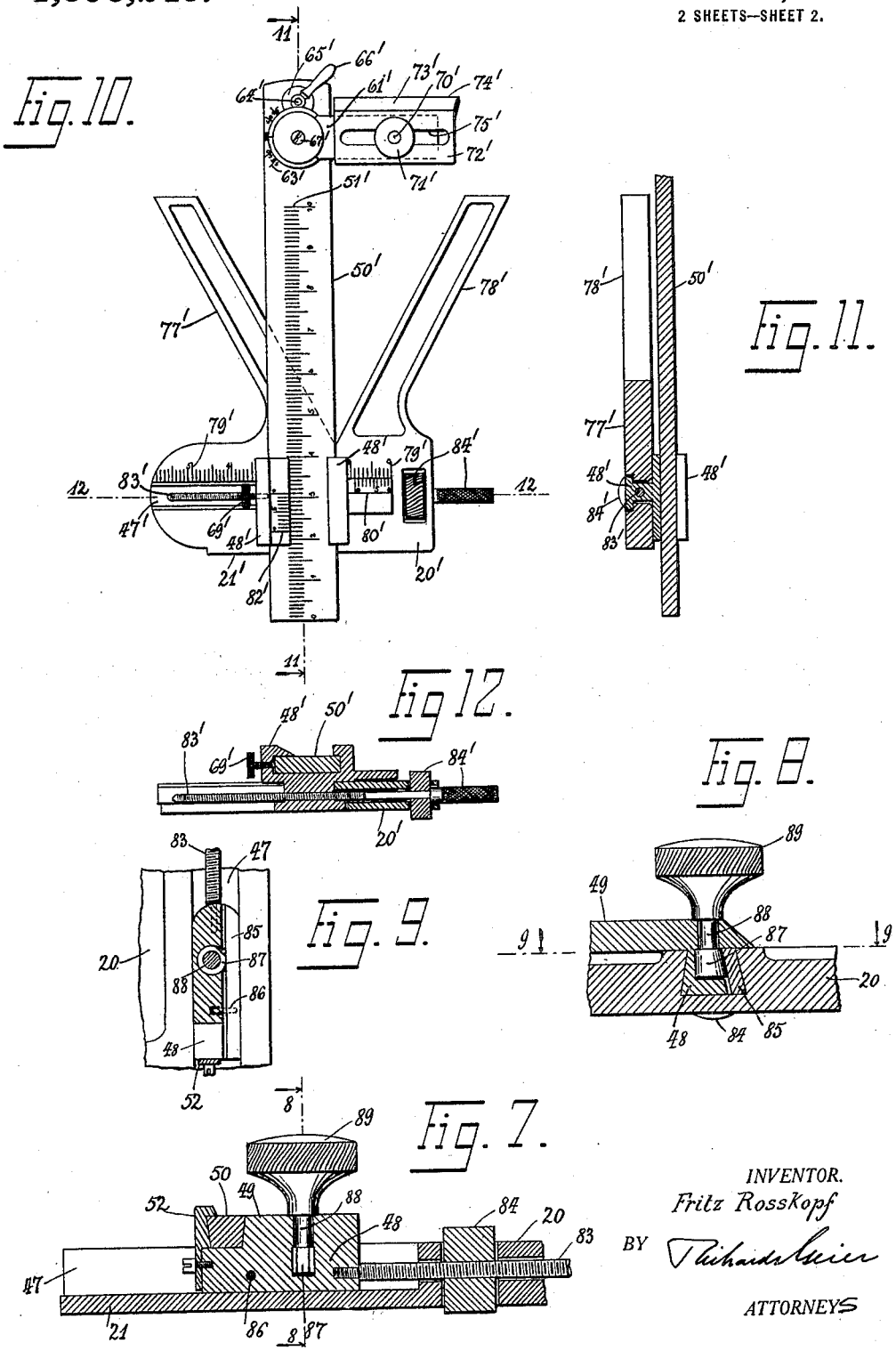
INVENTOR.
Fritz Rosskopf
BY
ATTORNEYS

UNITED STATES PATENT OFFICE.

FRITZ ROSSKOPF, OF WEST HOBOKEN, NEW JERSEY, ASSIGNOR TO MARTIN JOSEPH PRIZIO, OF KINGSTON, PENNSYLVANIA.

MEASURING AND PLOTTING INSTRUMENT.

1,398,243.          Specification of Letters Patent.      Patented Nov. 29, 1921.

Application filed August 7, 1920. Serial No. 401,930.

*To all whom it may concern:*

Be it known that I, FRITZ ROSSKOPF, a citizen of the Republic of Switzerland, residing at West Hoboken, county of Hudson, and State of New Jersey, have invented certain new and useful Improvements in Measuring and Plotting Instruments, of which the following is a specification.

My invention relates to devices for drawing or marking lines, and for measuring distances or dimensions, and has for its object to provide a compact instrument of this character which will enable the user to accomplish results that in ordinary practice require several different instruments.

In the accompanying drawings which illustrate two embodiments of my invention, Figure 1 is a front elevation of one form of the instrument; Figs. 2 and 3 are sections on lines 2—2 of Figs. 1 and 4 and 3—3 respectively of Fig. 1. Fig. 4 is a section on line 4—4 of Fig. 2; Figs. 5 and 6 are sections on lines 5—5 and 6—6 respectively of Fig. 3; Fig. 7 is a section on line 7—7 of Fig. 1; Fig. 8 is a cross section on line 8—8 of Fig. 7; Fig. 9 is a section on line 9—9 of Fig. 8; Fig. 10 is a front elevation of the second form of my invention, Figs. 11 and 12 are sections thereof on lines 11—11 and 12—12 respectively of Fig. 10.

The first form of my invention, shown in Figs. 1 to 9, comprises a body 20 having a straight edge 21 which is normally the horizontal lower edge of the said body. At one side is located a circular holder or socket 22 in which is pivoted a protractor disk 23 adjustable to various positions that may be determined accurately by bringing the proper mark of the graduation of said disk into registry with one of the marks 25 on the body, three such marks being shown, 90° apart, although other arrangements may be employed, and a single mark will do. The disk 23 may be locked after adjustment, as by means of a pivot pin 26 which is for instance made tight by screwing into the body and a clamping nut 27 screwing on said pin. The disk 23 has a rectilinear guide 28 at a distance from its center, and along this guide is adapted to move a bar or rule 29 having a scale 30. The path of the rule 29 thus lies in a plane perpendicular to the pivot axis, but does not intersect said axis. As a means for further guiding the rule 29, and for locking it against longitudinal movement when desired, I have shown the following device: To the disk 23 is secured rigidly a plate 31 extending partly over the rule 29 and if desired provided with a center mark 32. This plate is recessed to form a radial slideway 33 in which is movable a clamping slide 34 provided with a rib or lip 35 extending into a longitudinal groove 36 of the rule 29. The slide 34 thus moves at right angles to the path of the rule 29. In the plate 31 is pivoted about an axis parallel to the pin 26, a stud 37 having a handle 38 and also provided with a cam 39 fitted into an opening 40 of the slide 34. It will be understood that by turning the handle 38 the lip 35 and the rule 29 can be brought toward the guide 28 to clamp the rule in position, or the slide 34 and rule 29 may be moved slightly away from said guide, to allow the sliding movement of the rule. A washer 41 may be interposed between the plate 31 and the nut 27, and, as shown, this washer may be cut out to receive the stud 37, which will thus prevent the washer from turning on the plate. The ends of the rule 29 are preferably cut off obliquely, as shown, which facilitates placing the rule in position, and also makes it easier to fit on said rule, a removable and reversible slide 42 having a mark 43 to coöperate with the scale 30 and also having a projecting marker or scriber 44. To hold the slide 42 after adjustment, it is provided with a screw 45 adapted to force a clamping plate 46 against the edge of the rule 29.

At the side opposite to the disk 23, the body 20 has a slideway or guide 47, parallel to the edge 21, and along said guide is movable a slide 48, rigid with an arm 49 extending at a right angle to the path of the slide 48. Along one edge of said arm is movable, at right angles to the edge 21, a bar 50 preferably pointed at its lower end, and provided with a scale 51, the zero mark of which is preferably at an exact number of units (say two, as shown) from the pointed end. The bar 50 is guided partly by an L-shaped plate 52 secured to the slide 48, say by a screw 53, and partly by the outer portion of an auxiliary slide 54, preferably having a bearing plate 55 adjustable by means of screws 56 so as to vary the friction between said plate and the bar 50. The auxiliary slide is movable in the same direction as the bar 50, that is to say vertically if the edge 21 is assumed to be horizontal. For this purpose the arm 49 is provided with a longitudinal slot or guideway 57, and along this, on the face of the arm opposite to that engaged by the slide 54, moves a small slide 58 connected with the slide 54 in the manner to be set forth presently, so that both slides 54 and 58 will move in unison. The slide 54 also has a rib 59 projecting into the guide slot 57. The bar 50 is trapezoidal in cross section and the guide surfaces engaging its sides are given a corresponding inclination, the wide part of the cross section being toward the front, that is, toward the slide 54. A stop screw 60 may be provided to limit the downward movement of the bar 50 relatively to the slide 54. The slide 58, rib 59, and corresponding surfaces of the guideway 57 are preferably beveled as shown.

To the slide 54 a bar 61 is pivoted to swing about an axis parallel to that of the protractor disk 23. A mark 62 on the pivot end of said bar, and graduation marks 63 on the slide 54, enable the angular position of the bar 61 to be determined accurately, and for locking the bar at the desired angle after adjustment, I have shown a pin 64 screwed into the slide 54 and having a locking disk 65 the edge of which is adapted to engage the front surface at pivot end of the bar 61, a handle 66 serving to turn said screw. The pivot construction is as follows: A screw 67 passes loosely through openings in the bar 61, in the slide 54, and in a washer 68 fitted on said slide. The threaded reduced end of the screw engages a corresponding thread in the slide 58, and the screw is made tight to said slide by screwing it in until the shoulder of the screw engages the slide; that is, in the normal operation, the screw 67 and the slide 58 are connected rigidly. On the threaded body of the screw is fitted the clamping nut 69 adapted to engage the washer 68 and thus to press the slides 54 and 58 toward each other sufficiently to lock said slides to the arm 49, which requires but a relatively light pressure, so that the arm 61 is free to swing on the pivot screw 67 even when the slides 54, 58 are locked, the disk 65 being used when it is desired to lock the said arm 61.

To the arm 61 is secured rigidly a threaded pin 70, parallel to the pivot 67, and on this pin screws a clamping nut 71, to hold in position a slide 72 movable radially with respect to the pivot 67, that is to say, lengthwise of the arm 61. At one of its longitudinal edges, the slide 72 is provided with an oblique extension 73 the free edge of which, 74, is substantially in the same plane with the rear face of the arm 49. The slide has a longitudinal slot 75 for the passage of the pin 70, and a washer 76 is preferably interposed between said slide and the clamping nut 71.

At the upper portion of the body 20, adjacent to the right-hand or inner end of the guide 47, are provided two rigid arms 77, 78 diverging upwardly in V-fashion, the center line of such V being vertical, or perpendicular to the path of the slide 48, and in registry with said center line is placed the zero mark of a scale 79 along the guide 47, the arm 49 preferably having a vernier 80 to coöperate with said scale. The unit of the scale 79 is preferably the same as that of the scale 30, and preferably the bar 50 is so placed that when the right hand edge of the arm 49 is on the zero mark of the scale 79, the distance of the pointed end of the bar 50 from the vertical line passing through a mark 81 at the edge 21 corresponds to an exact number of units of said scales 79 and 30, for instance five units. This mark 81 is placed at any suitable point of said lower edge and is adapted to indicate on the scale 30 when the bar 29 is turned to the horizontal position indicated by dotted lines in Fig. 1. If desired, the proportions might be so chosen that the mark 81 will come vertically below the center of the protractor disk 23.

I also prefer to provide the arm 49 with another vernier 82 to coöperate with the scale 51 of the bar 50.

The following mechanism has been provided for shifting the slide 48 and the parts connected therewith, lengthwise of the guide 47. To the said slide is secured rigidly a screw 83 extending parallel to the guide 47, and the thread of said screw is engaged by an adjusting nut 84 mounted to turn in the body 20 but held against longitudinal movement. In order to lock the slide after adjustment, I have shown the following arrangement. The guide 47 is of dovetail formation, one side of it being engaged by a beveled surface of the slide, and the opposite side by a strip 85 which is held to move with the slide, as by means of pins 86 rigid with said strip and fitted slidably into transverse recesses of the slide 48, so that the strip 85 may be forced away from the slide 48, as by means of a cam 87 on a stud 88 journaled in the arm 49, said cam being located in a suitable recess of the slide 48. By turning the knob 89 rigid with the upper end of the stud 88, the strip 85 may be forced away from the slide, thus locking the slide against longitudinal movement.

In Figs. 10, 11 and 12, I have illustrated a second form of my invention, which embodies only some of the parts described in connection with the first form, and those parts in a simplified arrangement. A detailed description of this second form will not be necessary, in view of the fact that similar reference numerals, with indices, designate parts corresponding to those of Figs. 1 to 9. It will be observed that the slide 48' has no arm corresponding to 49, and that the vertically-sliding bar 50' is made comparatively wide, the arm 61' being pivoted to this bar at 67', and the locking disk 65 at 64', in the same manner that these parts are connected with the slide 54 in the first form of my invention. The formation of the slide 48' and of its adjusting mechanism is slightly different from the corresponding parts of Figs. 1 to 9, but will be readily understood from the drawing. The screw 83' in this case has a threaded engagement with the slide 48', and the part 84' is rigid with said screw. Of course, the instrument shown in Figs. 10, 11, and 12 can be used only for some of purposes for which the more complete apparatus of Figs. 1 to 9 is adapted.

The instrument described above is available for various purposes, and I shall not attempt to give an exhaustive explanation of its uses, but will mention only a few of them. The bar 50 or 50' constitutes a depth gage, in connection with the edge 21 or 21'. This edge may be used for drawing a horizontal line, or for positioning the instrument. Vertical lines may be drawn along the right hand edge of the arm 49 or of the bar 50' respectively. The arms 77, 78 or 77' are adapted to receive between them rods or other round objects, of varying diameters, which obviously will automatically adjust themselves so that their centers will be in the (vertical) bisectrix of the angle formed by said arms. In each case, the zero mark of scale 79 or 79' is so placed that the right-hand edge of the arm 49 or of the bar 50' respectively will be in line with said bisectrix when the indicating edge or mark of the slide 48 or 48' (right-hand edge of the vernier 80 or 80' respectively) is in line with said zero mark. This position is illustrated in Fig. 10. If for instance, it is desired to mark on a round object placed between the arms 77, 78 or 77' 78', a square the side of which is equal to two units of the scale, the slide 48 or 48' will be adjusted toward the left until the right-hand edge of the vernier 80 or 80' is in line with the mark 1 of the scale 79 or 79' respectively (one half of the side of the square). Then a vertical line will be marked on the plane circular end surface of said round object, along the right hand edge of the arm 49 or of the bar 50' respectively. The pivoted arm 61 or 61' is adjusted to stand at right angles to said edge, the rod or other round object is turned on its axis until the originally vertical line marked thereon assumes a horizontal position, as determined by the coincidence of said line with the edge 74 of the slide 72, this latter slide and the slide 54 or the bar 50' being moved until they are in proper position to bring the edge 74 in registry with the line marked on the round object. The slide 54 or bar 50' may then be locked against vertical movement, by tightening the nut 69 or the screw 69'. A second line of the square is then drawn along the right hand edge of the arm 49 or of the bar 50' respectively, and by adjusting the round object to new positions, 90° apart, in the same manner as described above, the remaining sides of the square can be marked. If the round object is so large that the edge 74 or 74' when at the bottom of the slide 72 or 72' (as in Fig. 1) cannot be brought to registry with the line marked on said object, I may turn the slide around, or reverse it, so that the edge 74 or 74' will be the upper edge of said slide, as indicated in Fig. 10. By adjusting the arm 61 or 61' to angles other than 90°, triangles, hexagons, and other figures may be marked on a round object.

The protractor disk 23 and the rule 29, of Figs. 1 to 9 may be used for drawing or marking lines at various predetermined angles, or for measuring angles. By turning the rule 29 to a horizontal position, as indicated by dotted lines in Fig. 1, and reversing the marker slide 42 from the position shown in full lines to that indicated by dotted lines, the instrument can be used as compasses, the pointed end of the bar 50 serving as a fulcrum about which the point of the marker 44 describes a circle. The radius of this circle can be readily figured by reading off on the scale 30, the distance between the marks 43 and 81, and adding to this distance the predetermined number of units (five, as assumed) which indicates the horizontal distance of the mark 81 from the center line of the bar 50 when the slide 48 is at zero, plus the distance (one half unit in the position illustrated by Fig. 1) which said slide has been shifted to the left of the zero position.

Other uses will be apparent to persons accustomed to the handling of instruments of the class described.

Various modifications may be made without departing from the nature of my invention as set forth in the appended claims.

I claim:—

1. An instrument of the class described, comprising a body having arms arranged at an angle to each other, a slide movable relatively to said body in a direction perpendicular to the bisectrix of said angle, a member connected to move in unison with said slide and having an edge parallel to said bisectrix, and an arm pivoted to said member.

2. An instrument of the class described, comprising a body having arms arranged at an angle to each other, a slide movable relatively to said body in a direction forming an angle with the bisectrix of said first-named angle, a member carried by said slide and having an edge at an angle to the path of the slide, and an arm pivoted to the said member.

3. An instrument of the class described, comprising a body having arms arranged at an angle to each other, a slide movable relatively to said body in a direction forming an angle with the bisectrix of said first-named angle, a member carried by said slide and extending at an angle to the path of the slide, an arm pivoted to said member, and a slide adjustable lengthwise of said pivoted arm.

4. An instrument of the class described comprising a body having arms arranged at an angle to each other, a slide movable relatively to said body in a direction forming an angle with the bisectrix of said first-named angle, a member carried by said slide and extending at an angle to the path of the slide, an arm pivoted to said member, a reversible member carried by said pivoted arm and having an extension along one of its longitudinal edges, and means for connecting said reversible member with said pivoted arm in such a way that said extension may be brought adjacent to either longitudinal edge of said pivoted arm.

5. An instrument of the class described, comprising a body having arms arranged at an angle to each other, a slide movable relatively to said body in a direction forming an angle with the bisectrix of said first-named angle, another slide carried by the first-named slide and movable relatively thereto in a direction at an angle to the path of the first-named slide, and an arm pivoted to said second slide.

6. An instrument of the class described, comprising a body having arms arranged at an angle to each other, a slide movable relatively to said body in a direction forming an angle with the bisectrix of said first-named angle, a transverse bar carried by said slide and mounted to slide relatively thereto in a direction at an angle to the path of said slide, and an arm pivoted to said sliding transverse bar.

7. An instrument of the class described, comprising a body having arms arranged at an angle to each other, a slide movable relatively to said body in a direction forming an angle with the bisectrix of said first-named angle, an arm rigid with said slide and transverse to the path thereof, another slide movable along said transverse arm, and another arm pivoted to said second slide.

8. An instrument of the class described, comprising a body having arms arranged at an angle to each other, a slide movable relatively to said body in a direction forming an angle with the bisectrix of said first-named angle, an arm rigid with said slide and transverse to the path thereof, a measuring bar mounted to slide lengthwise of said transverse arm, another slide movable along said transverse arm in the same direction as said bar but independently thereof, and an arm extending from said second slide transversely to the path thereof.

9. An instrument of the class described, comprising a body having arms arranged at an angle to each other, a slide movable relatively to said body in a direction forming an angle with the bisectrix of said first-named angle, an arm rigid with said slide and transverse to the path thereof, another slide movable along said transverse arm, another arm pivoted to said second slide, and independent means for locking the second slide to said rigid arm, and the pivoted arm to said slide respectively.

10. An instrument of the class described, comprising a body, a slide thereon, a pointed member carried by said slide, a rule pivotally connected with said body and adapted to be brought into a position parallel to the path of said slide, and a scriber carried by said rule.

11. An instrument of the class described, comprising a body, a slide thereon, a pointed member carried by said slide and adjustable relatively thereto transversely to the path of the slide, another member pivoted to said body, a rule carried by said pivoted member and slidable lengthwise, and a scriber carried by said rule and adjustable lengthwise thereof.

12. An instrument of the class described, comprising a body, a slide thereon, a member carried by said slide and adjustable at a right angle to the path thereof, a rule pivotally connected with said body and adapted to be brought into a position parallel to the path of the slide, and a scriber adjustable lengthwise of said rule.

13. An instrument of the class described, comprising a body, a slide thereon, a member carried by said slide and adjustable transversely of the path of the slide, and a scriber connected with said body pivotally and also adjustable lengthwise of the path of the slide, to different distances from said transversely-adjustable member.

In testimony whereof I have affixed my signature.

FRITZ ROSSKOPF.